| United States Patent [19] | [11] | 4,125,674 |
|---|---|---|
| Kimura et al. | [45] | Nov. 14, 1978 |

[54] ALUMINUM FOIL FOR AN ELECTRODE OF AN ELECTROLYTIC CAPACITOR

[75] Inventors: Tohru Kimura, Nara; Osamu Iwao, Ashiya; Masahiko Kawai, Daito; Hiroshi Tanimoto, Nara, all of Japan

[73] Assignee: Toyo Aluminium Kabushiki Kaisha, Osaka, Japan

[21] Appl. No.: 667,618

[22] Filed: Mar. 17, 1976

[30] Foreign Application Priority Data

| Mar. 28, 1975 | [JP] Japan | 50-38852 |
| Mar. 28, 1975 | [JP] Japan | 50-38853 |
| May 19, 1975 | [JP] Japan | 50-61406 |

[51] Int. Cl.$^2$ ............................................. B32B 15/04
[52] U.S. Cl. .................................... 428/469; 428/539; 427/81; 204/35 N; 148/6.2
[58] Field of Search .................. 428/469, 539; 427/81; 204/35 N; 148/6.2

[56] References Cited

U.S. PATENT DOCUMENTS

| 2,279,253 | 4/1942 | Slunder | 428/469 X |
| 3,271,192 | 9/1966 | Thun et al. | 428/469 |
| 3,733,291 | 5/1973 | Alwitt | 204/35 N X |
| 3,813,266 | 5/1974 | Porta et al. | 427/81 |
| 3,955,023 | 5/1976 | Blakely | 428/469 X |

*Primary Examiner*—P. C. Ives
*Attorney, Agent, or Firm*—Wenderoth, Lind & Ponack

[57] ABSTRACT

Aluminum foil for an electrode of an electrolytic capacitor is disclosed. The foil comprises at least one core layer adapted to prevent the growth of pits by electrolytic etching, and outer layers formed on both surfaces of the core layer. A large number of etching pits are produced in the outer layers. In a modification, the core layer contains more iron than the outer layers. Again in a modification, the core layer is covered or contained with aluminum oxides or hydroxides.

8 Claims, No Drawings

ALUMINUM FOIL FOR AN ELECTRODE OF AN ELECTROLYTIC CAPACITOR

The present invention relates to aluminum foil for use in an electrode of an electrolytic capacitor.

It is well known that the surface of aluminum anode foil is enlarged by the electrolytic etching process to increase the capacitance of an electrolytic capacitor. In order to get the largest possible surface area, that is, to get the largest possible capacitance, etching pits formed by the above mentioned etching are desirably deep to an extent to penetrate the thickness of the foil and the number of etching pits per unit area should be as many as possible. However, the mechanical strength of such etched foil, especially the folding strength, becomes extremely weak and insufficient for the succeeding process.

While, due to the recent strong demand for an electrolytic capacitor of small dimensions, there arises a requirement for an etched foil capable of bearing the high speed coiling of a smaller radius.

An object of the present invention is to provide aluminum foil for an electrolytic capacitor having a larger mechanical strength, especially, folding strength, along with the possible largest surface area.

Hereupon, the present inventors have researched the relationship between the configuration of etching pits and the metallurgical factors such as crystal structure of foil and alloying elements as well as the relation between the configuration of etching pits and the surface gain, i.e., increase in capacitance, of aluminum foil used in a high voltage electrolytic capacitor.

It was found that when the etching pits formed electrolytically on the surface of aluminum foil are too fine and accordingly are filled up with the aluminum oxide layer (dielectrics) by a given anodizing voltage of the following process, capacitance gain would not be expected in spite of the enlarged surface area. In the case of the coarse, step-like pits produced along the specific crystal faces by chemical etching, the surface gain is not sufficient compared to the amount of aluminum dissolved, and the capacitance therefore does not become higher as expected.

Moreover, the fact was revealed that when the etching pit is of a capillary shape and the diameter thereof is larger than the thickness of above-mentioned dielectric oxide layer, the deeper the pits penetrate into the direction of aluminum foil thickness, and the bulk of aluminum can be more effectively utilized for the surface gain. This makes it possible to obtain etched foil having a larger effective surface area. In order to get the largest possible surface area, it seems necessary for these capillary pits to penetrate linearly to the opposite surface of the foil. However, it does not contribute to the gain of the surface area or to the capacitance at a high voltage when these pits fail to penetrate to the opposite surface, since the dissolution of aluminum on the surface increases as a result of it.

The present inventors made further studies on the factors preventing the surface gain, i.e., the factors preventing the growth of capillary etching pit, and found that the growth of pit is prevented by aluminum oxides or hydroxides contained in aluminum matrix, intermetallic compounds or clusters of iron, and crystal irregularities caused by the impurity elements or grain boundaries. That is to say, the pit grows along the specific crystallographic direction of aluminum by the electrolytic etching, but its growth is prevented at the point where said aluminum oxides or hydroxides, intermetallic compounds or clusters of iron, and crystal irregularities exist.

As mentioned above, in order to obtain the etched foil having a larger surface area, it is necessary to produce as many capillary pits as possible to penetrating through the foil. The mechanical strength of etched foil, however, decreases as the surface area is increased, that is, the increase of surface area and the mechanical strength provide the contradictory relations for obtaining the ideal foil for an electrode of a capacitor.

Accordingly, the inventors conceived the important idea that the largest possible number of pits should be formed in the outer layer without dissolving the core layer in the cross-section of aluminum foil. It is then easily understood according the results shown above that the core layer should contain the aluminum oxides or hydroxides, a larger amount of intermetallic compounds or clusters of iron than the outer layers, or the interface of lattice irregularities such as grain boundaries parallel to the foil surface.

That is, a super purity aluminum sheet ingot which is produced having the characteristic property of preventing the growth of etching pit is put, as a core layer, between two aluminum sheet ingots of super purity and this sheet ingot of multiple layers is then rolled to produce aluminum foil comprising three layers. The foil is electrolytically etched to form as large a number of pits as possible in the outer layers. In other words, the sheet ingot serving as the core layer is previously covered with an aluminum oxide layer or contained with aluminum oxides or hydroxides, or intermetallic compounds or clusters of iron more than the sheet ingots of outer layers.

Instead of selecting the particular sheet ingot for a core layer as mentioned above, when the three sheet ingots of the same quality stacked one by one are rolled at the same time, the lattice irregularities are generated at the interface of the foil. Although it is confirmed that a part of the rolled interface is metallurgically connected with bulk metals, lattice irregularities at the interface are also seen due to the differences of impurity elements and amounts thereof, degree of work hardening, surface conditions of sheet ingots before rolling, and the like. It is, therefore, sufficient for our object that the interfaces between the core and outer layers have such discontinuous lattice irregularities parallel to the foil surface, in view of the relation between the surface gain and the folding strength required to the aluminum foil for an electrolytic capacitor electrode.

In order to more clearly illustrate the present invention, references are presented as the following examples. Throughout the examples, contents of impurity elements are indicated as percentages by weight, unless otherwise specified.

EXAMPLE 1

There were prepared two outer layer sheet ingots of 68 × 350 × 600 mm in size and one core layer sheet ingot of 15 × 350 × 600 mm, both made of super purity aluminum containing 0.002% of Fe, Si and Cu, respectively, as well as other impurities to the same extent as contained in ordinary super purity aluminum. The core layer sheet ingot was exposed to anodic oxidation, in 4% solution by volume of sulfuric acid, at 20° C for one minute. This core layer sheet ingot was put between the two outer layer sheet ingots and heated at 500° C for 10 hours. This combined sheet ingot was hot-rolled to the thickness of 3 mm, and thereafter cold-rolled to the thickness of 0.1 mm. This was annealed in inert atmosphere at 550° C to obtain an annealed aluminum foil.

EXAMPLE 2

The outer layer and core layer sheet ingots same as example 1 were prepared, the latter being covered with hydroxides by dipping in boiled water for one minute. Thereafter, in the same manner as example 1, a 0.1 mm thick annealed aluminum foil was obtained.

EXAMPLE 3

The outer and core layer sheet ingots same as example 1 were prepared, the latter being covered with aluminum oxides by heating in the air at 550° C for 3 hours. Thereafter by the same process as example 1, a 0.1 mm thick annealed aluminum foil was obtained.

EXAMPLE 4

There were prepared two outer layer sheet ingots same as example 1 together with 68 × 350 × 600 mm in size of a core layer sheet ingot having the same composition as example 1. The core layer sheet ingot was heated at 500° C for 5 hours and hot-rolled to the thickness of 15 mm. This core layer sheet ingot was put between said two outer layer sheet ingots, and thereafter in the same manner as example 1, a 0.1 mm thick annealed aluminum foil was obtained.

EXAMPLE 5

There were prepared a pair of outer layer sheet ingots same as example 1 together with three core layer sheet ingots respectively of 5 × 350 × 600 mm in size having the same composition as example 1. The core layer sheet ingots were heated at 550° C for 3 hours in the air to be covered with aluminum oxides. These core layer sheet ingots were put between said two outer layer sheet ingots so as to overlap one on the other, and pursuing the same process as example 1, a 0.1 mm thick annealed aluminum foil was obtained.

EXAMPLE 6

By a semi-continuous water-cooled casting was produced a sheet ingot of 150 × 350 × 600 mm in size consisting of three layers and having the same composition as example 1. About 15 mm thick core layer was added with atomized aluminum powder so as to positively include the aluminum oxides in the core layer. Since the sheet ingot was produced by casting, there was no clear interface between the core and outer layers. However throughout the portion corresponding to the core layer were dispersed aluminum oxides to form a layer different in amount of aluminum oxides as compared to others. This sheet ingot was processed in the same manner as example 1 to obtain a 0.1 mm thick annealed aluminum foil.

EXAMPLE 7

Two outer layer sheet ingots of 68 × 350 × 600 mm in size were produced from super purity aluminum containing 0.001% of Fe, 0.001% of Si and 0.005% of Cu as well as other impurity elements to the same extent as an ordinary super purity aluminum. A core layer sheet ingot of 15 × 350 × 600 mm was also produced from super purity aluminum containing 0.002% of Fe, 0.002% of Si and 0.002% of Cu. The core layer sheet ingot was inserted between the outer layer sheet ingots so as to overlap one on the other, and was heated at 500° C for 10 hours. Thereafter the sheet ingot of three layers was hot-rolled to the thickness of 3 mm and further cold-rolled to the thickness of 0.1 mm. The foil was annealed in inert atmosphere at 550° C to obtain an annealed aluminum foil.

EXAMPLE 8

There were prepared two outer layer sheet ingots same as example 7 and a core layer sheet ingot in the same size as example 7 made of super purity aluminum containing 0.002% of Fe, 0.001% of Si and 0.005% of Cu. In the same manner as example 7, a 0.1 mm thick annealed aluminum foil was obtained.

EXAMPLE 9

As outer layer sheet ingots, super purity aluminum containing 0.006% of Fe, 0.002% of Si and 0.001% of Cu, and as a core layer sheet ingot, super purity aluminum containing 0.10% of Fe, 0.004% of Si and 0.001% of Cu were used to obtain a 0.1 mm thick annealed aluminum foil in the same manner as example 7.

EXAMPLE 10

By a semi-continuous casting was produced a sheet ingot of 150 × 350 × 600 mm in size, each of the outer layers having the thickness of 60 mm containing 0.002% of Fe, 0.002% of Si and 0.002% of Cu, and the 30 mm thick core layer containing 0.10% of Fe, 0.002% of Si and 0.002% of Cu. The sheet ingot was processed in the same manner as example 7 to obtain a 0.1 mm thick annealed aluminum foil.

EXAMPLE 11

Two outer layer sheet ingots of 68 × 350 × 600 mm and a core layer sheet ingot of 15 × 350 × 600 mm were produced by using super purity aluminum containing 0.001% of Fe, 0.001% of Si and 0.005% of Cu. Pursuing the same process as example 7, a 0.1 mm thick annealed aluminum foil was obtained.

CONTROL 1

A sheet ingot of 150 × 350 × 600 mm was prepared by using super purity aluminum containing 0.002% of Fe, 0.002% of Si and 0.002% of Cu. This was heated at 500° C for 10 hours, and hot-rolled to the thickness of 3 mm. Thereafter the sheet ingot was cold-rolled to the thickness of 0.1 mm, and annealed at 550° C in inert atmosphere to obtain an annealed aluminum foil.

CONTROL 2

A sheet ingot of 150 × 350 × 600 mm was prepared by using super purity aluminum containing 0.001% of Fe, 0.001% of Si and 0.005% of Cu. The sheet ingot was heated at 500° C for 10 hours and hot-rolled to the thickness of 3 mm. This was cold-rolled to the thickness of 0.1 mm and annealed at 550° C in inert atmosphere to obtain an annealed aluminum foil.

Each of the annealed aluminum foils obtained in the above examples and controls was electrolytically etched and anodized under the conditions mentioned below. The capacitance of each of the anodized foils was measured in 80 g/l solution of ammonium borate, at 20° ± 5° C, by means of a universal bridge of 120 c/s. Accordingly, the surface gain referred to in this invention is shown by the capacitance of the foil anodized at 350 V.

With respect to each of the unanodized foils, the folding strength was measured under the load of 250 g, at curvature radius of 2 mm and folding angle of 90°.

The results of above measurements are shown in Table I.

CONDITION OF ETCHING

1. Electrolyte: 4% solution of hydrochloric acid
2. Temperature: 70° C
3. Current Density: 17 A/dm$^2$ (current per unit projecting area)
4. Period: for 6 minutes

CONDITION OF ANODIZING

1. Anodizing Solution:
   20 g/l of boric acid plus
   20 g/l ammonium borate
2. Temperature: 20° ± ±5° C
3. Current Density: 1200 mA/dm$^2$ (current per unit projecting area)
4. Anodizing Voltage: 350 V
5. Projecting Area of Test Piece: 2.5 × 10 cm$^2$

TABLE I

| Example No. | Capacitance ($\mu$F/25 cm$^2$) | Folding Strength (times) |
|---|---|---|
| 1 | 14.9 | 48 |
| 2 | 15.0 | 40 |
| 3 | 14.9 | 39 |
| 4 | 15.4 | 39 |
| 5 | 15.1 | 43 |
| 6 | 15.0 | 46 |
| 7 | 15.0 | 41 |
| 8 | 14.9 | 43 |
| 9 | 14.5 | 50 |
| 10 | 14.2 | 54 |
| 11 | 15.2 | 35 |
| Control 1 | 15.3 | 26 |
| Control 2 | 15.3 | 26 |

With respect to each of the above examples and controls, in order to observe the configuration of pit of aluminum foil etched by electrolytic etching, each of the foils was anodized at 150 V and dissolved in bromine-methanol solution. The replica obtained was then examined by a scanning electron microscope. In the examples it was observed that most of pits stop at the center of the cross-section of the foil, while in the controls, most of pits penetrate through the foil to the opposite surface thereof, whereby it was ensured that the present invention completely embodies the original ideas mentioned before.

The surface gain as well as folding strength required for the etched aluminum foil is determined by the position of core layer containing aluminum oxides or hydroxides, intermetallic compounds or clusters of iron, or lattice irregularities which prevent the growth of etching pit. If desired to obtain a larger surface gain in spite of the decrease of folding strength, the interface of such core layer may be positioned more closely to the center of the cross-section of foil, while if desired to obtain a higher folding strength at the expense of surface gain to some extents, the interface may be positioned more closely to the surface of aluminum foil.

Though the present invention can be applied to any super purity aluminum for an electrode of an electrolytic capacitor, it is preferable that the purity of aluminum for the outer layers is 99.99%, i.e., the contents of iron are lower than 0.006%, since the core layer should contain more iron in case of constituting the core layer which contains the intermetallic compounds or clusters of iron. Furthermore, the core layer is not always a single layer but can be multiple layers.

According to the present invention as described above, since the interface preventing the growth of the etching pit is comprised within the aluminum foil, the dissolution of the core layer by electrolytic etching can be minimized even if the surface area is enlarged to the largest possible extent, thereby making it possible to obtain an aluminum electrode foil having a superior mechanical strength as well as a large capacitance.

We claim:

1. An aluminum foil adapted to be used as an electrode of an electrolytic capacitor composed of three layers including two outer layers which contains etch pits on the outer surfaces thereof and an inner core layer sandwiched therebetween which is substantially free of etch pits, said aluminum foil being produced by bringing together three aluminum sheet ingots, the outer ingots of which have a purity of 99.9% or higher, rolling the ingots into the form of a foil, annealing the thus-produced foil and then electrolytically etching the sheet.

2. An aluminum foil as claimed in claim 1, wherein said core layer has a larger iron content than the outer layers.

3. An aluminum foil as claimed in claim 2, wherein said core layer has a lower purity than 99.9%.

4. An aluminum foil as claimed in claim 1, wherein said core layer is coated with aluminum oxides.

5. An aluminum foil as claimed in claim 1, wherein said aluminum sheet ingot for the core layer includes two or more sheet ingots.

6. An aluminum foil adapted to be used as an electrode of an electrolytic capacitor composed of three layers including two outer layers which contain etch pits on the outer surfaces thereof and an inner core layer sandwiched therebetween which is substantially free of etch pits, said aluminum foil being produced by semi-continuous casting, followed by rolling, annealing and electrolytic etching.

7. An aluminum foil as claimed in claim 6 wherein said core layer contains aluminum oxide particles.

8. An aluminum foil as claimed in claim 6 wherein said core layer contains aluminum hydroxide particles.

* * * * *